Sept. 24, 1963    E. F. PETERSON    3,104,432
BLOW TUBE AND METHOD OF MAKING SAME
Filed Sept. 21, 1960    2 Sheets-Sheet 1
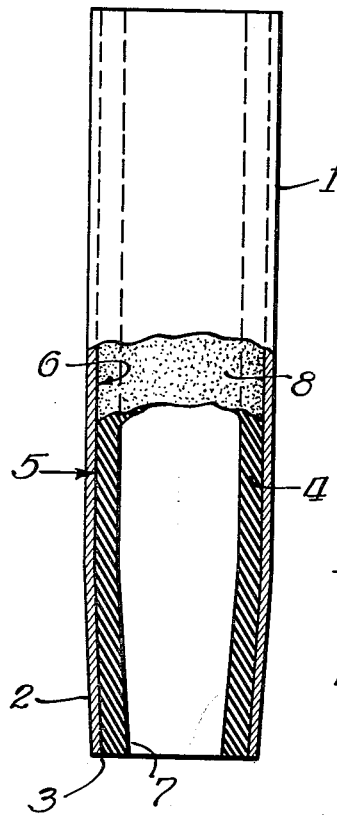
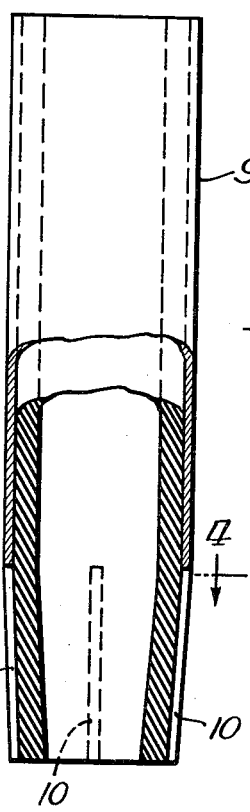
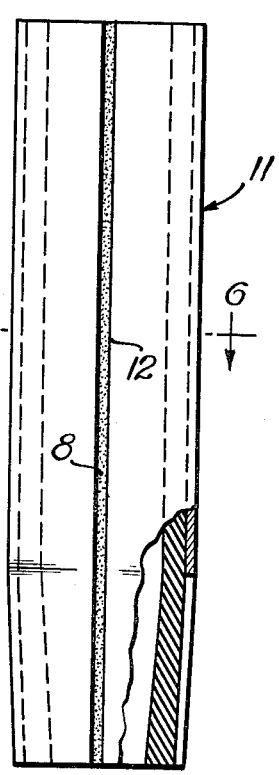
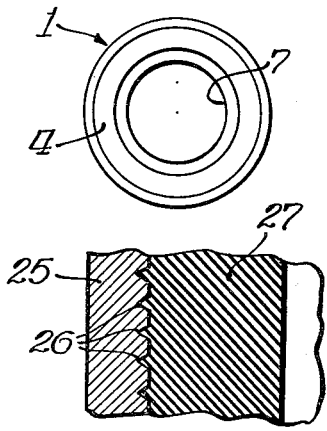
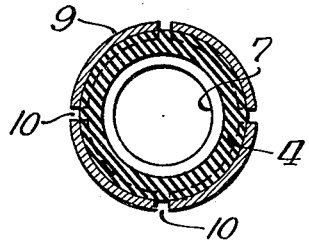
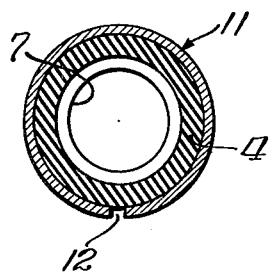
INVENTOR:
Edwin F. Peterson
BY
Eberhard E. Wolley
Atty.

Sept. 24, 1963     E. F. PETERSON     3,104,432
BLOW TUBE AND METHOD OF MAKING SAME
Filed Sept. 21, 1960     2 Sheets-Sheet 2
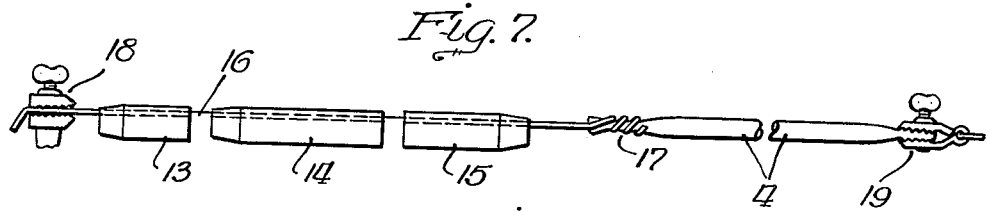
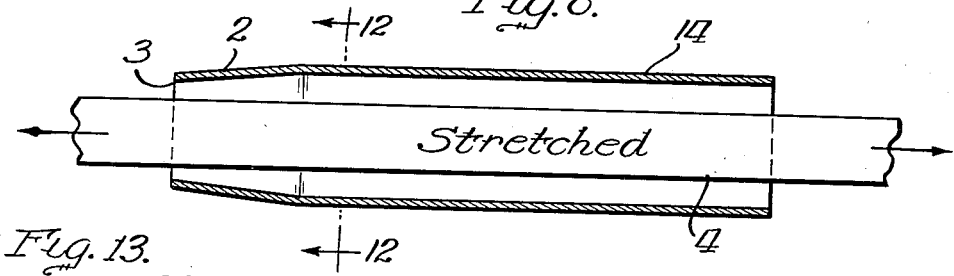
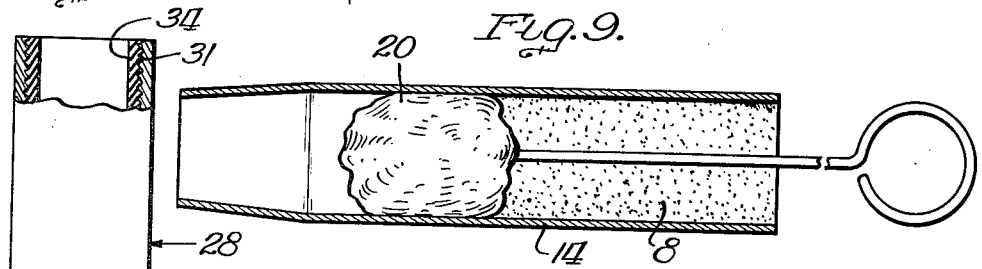
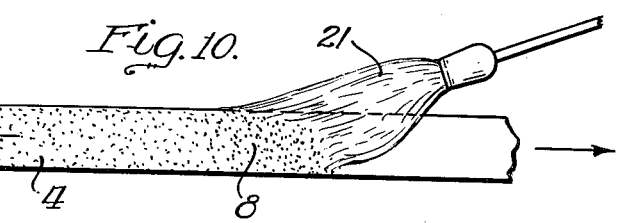
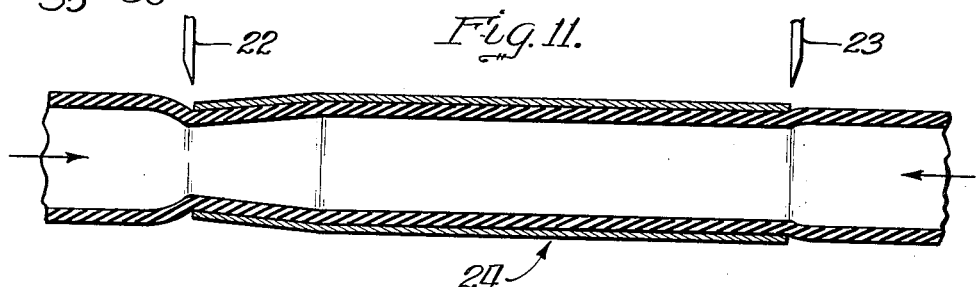
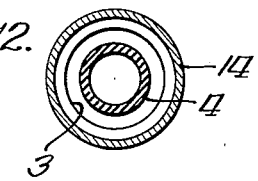
INVENTOR:
Edwin F. Peterson
BY
Eberhard E. Wetley
Atty.

United States Patent Office 3,104,432
Patented Sept. 24, 1963

3,104,432
BLOW TUBE AND METHOD OF MAKING SAME
Edwin F. Peterson, P.O. Box 151, Neponset, Ill.
Filed Sept. 21, 1960, Ser. No. 57,542
7 Claims. (Cl. 22—13)

This invention relates to a blow tube of the character widely employed in the foundry field for core sand delivery as, for example, between a sand box and a core box.

More specifically, the invention is directed to a composite form of blow tube having a rigid exterior tube or casing completely lined with a wear resistant elastic material normally of a rubber-like nature which may be natural or synthetic in composition.

The productive efficiency and long wear of tubes having wear resistant linings are well recognized by the foundry trade. However, the problem has been to produce such tubes in volume and inexpensively, since molding liners into individual tubes under press methods is slow, expensive and it involves a critical process considering the obtainment of a good bond between the liner and the metal outer tube.

One of the objects of the present invention is to provide a blow tube having a resilient or elastic wear resistant liner and which tube is developed and made by the union or assembly of a rigid outer tubular casing with an extruded resilient sleeve or tube lining the outer casing.

Another object is to provide a blow tube having a restricted discharge end to function as a choke to support a column of sand within the tube or to prevent free flow of core sand from the tube except as directed under working conditions.

A further object is to construct blow tubes of this composite nature under far less critical conditions and through a method that is quick, inexpensive and quite simple.

A still further object is to provide a blow tube that allows some diametral tolerance to better accommodate itself to different hole sizes in a sand box blow plate or in a core box as the case may be.

Another object relates to the union of an elastic or resilient liner within the internal confines of a rigid blow tube and the securing of said liner and tube to each other at their interfacial areas through the use of a bonding material employed to unite such two elements at such interfacial areas.

As a further object, a liner of extruded resilient sleeve material may be coated with a bonding material and the interior of a tube may be similarly coated, or at least one of such coatings being used, and the liner can then be drawn into the tube for interfacial contact with the bonding being allowed to set or cure after assembly.

Another object is to suspend a resilient tubular or hollow liner in a stretched condition to permit one or more blow tube elements or casings to be freely moved upon the stretched liner, and subsequently causing the release of tension on said liner to let the latter reform into its original shape to expand into the blow tube elements. In this connection the invention contemplates the use of a liner having an external diameter somewhat greater than the internal diameter of the tube element or casing, whereupon the liner is then limited in resuming its normal maximum shape under release of endwise tension, to induce a certain amount of radial pressure in the liner directed against the casing along the interfacial contacting areas between such units.

Other objects include the use of bonding materials such as adhesive or cements of suitable kinds including heat activated bonding substances for fixedly securing the liner to the tube. In the case where the heat activated bonding materials are employed, a further step is contemplated providing a heating cycle for the assembled tube to activate the bonding material for proper union. Where volatile bonding substances are employed, the invention further provides a tube having a channel or slit along its face to provide communication between a portion of the interfacial area and atmosphere to enhance the drying of the bonding material. This slit inclusion is particularly well adapted to tubes of greater lengths on the order of 12 to 14 inches, although this principle would apply equally well to tubes of any length. The same slit permits diametral adjustment of a tube allowing easy tube insertion into an opening insuring tightness when oriented, the spring or resiliency of the tube contributing to this action.

Another advantage in the method herein disclosed in making lined blow tubes is the unlimited use of hollow liners of variable lengths of uniformly extruded cross sectional shapes that are readily adaptable to tube casings of variable lengths for lining such casings. In the prior molding procedures employed to line such tubes, each tube length needs a different die arrangement.

All other objects and advantages shall hereinafter appear or become apparent from the following detailed description having reference to the accompanying drawings forming a part of this specification.

In the drawings:

FIG. 1 is a side elevational view of a blow tube of the present invention shown partially broken away and in section;

FIG. 2 is a plan view of the tube in FIG. 1;

FIG. 3 shows a side elevational view of a modified tube constructed according to the principles of this invention, part of the tube being shown in section;

FIG. 4 is a cross sectional view of the tube in FIG. 3 as it appears along the plane of the line 4—4 in FIG. 3;

FIG. 5 is another side elevational view of a modified blow tube a fragmentary part of which is in section;

FIG. 6 is a transverse cross sectional view of the tube in FIG. 5 substantially as seen along the plane of the line 6—6 in FIG. 5;

FIG. 6A shows a fragmentary enlarged section of one wall portion of another modified tube structure;

FIG. 7 is a diagrammatic side elevational view demonstrating the general method employed in assembling the outer rigid tube casings over a tubular liner;

FIG. 8 is an enlarged view, partially in section, of one portion of the FIG. 7 arrangement to illustrate the next step in the concept of the stretched hollow liner and the movement of one casing element thereover into a selected position;

FIG. 9 illustrates the aplication of a bonding material into a tube or casing member of the tube structure;

FIG. 10 illustrates the application of bonding material to the exterior of the elastic liner prior to the reception of a tube casing;

FIG. 11 illustrates substantially what takes place under release of tension on a stretched liner prior to severance of the liner by suitable cutters operated in the planes of the tube ends;

FIG. 12 is a cross sectional view taken along the plane of the line 12—12 in FIG. 8; and FIG. 13 shows another modified tube with its ends in section.

Blow tubes constructed according to the concept of the present invention broadly provide a composite union between a rigid outer tube and a resilient inner lining for said tube. The tube is preferably constructed from metal which may be thin walled steel, as for example .030 inch in thickness, and the metal has a slight spring hardness to give it the facility to hold its designed shape and external diameter.

In general, the tubes are preferably made in three ways as best classified in (a) FIGS. 1 and 2, (b) FIGS. 3 and 4, and (c) FIGS. 5 and 6.

In FIGS. 1 and 2 the blow tube comprises a steel outer tube 1 of solid metal which is swedged radially inwardly at 2 to form a choke or restricted throat end 3, and a liner 4 in the form of an extruded resilient sleeve is firmly lodged within the tube 1. The liner 4 is made with an external diameter 5 that is somewhat greater than the internal bore diameter 6 of the tube, the latter actually forming a casing of a given internal contour that acts to grip the liner 4 after the latter is moved into or otherwise bodily brought into the tube or casing.

The liner 4 is a sleeve of extruded resilient or elastic material of uniform cross sectional structure. When it is assembled into the tube 1, the liner follows the interfacial surface contour of the tube and the swedged tube end 2, and the liner is radially inwardly constricted at 7 by the tube deformation and contracted so that the wall thereof is thickened, particularly toward the throat end 3 of the tube thus providing a greater frictional lined choke end in the tube and added wear resistant material is circumferentially disposed within the tube at the point of greatest wear along the length of the tube.

A bonding material 8 is employed over the interfacial surface areas between the tube 1 and the liner 4 to establish a positive union between the composite units of the blow tube, thus counteracting any separation between liner and tube or casing which would interfere with the continued efficient operation of the tube and which would lead to liner collapse within the tube under operative conditions.

The liner 4 may be made from any suitable rubber-like material or from any material having the characteristics of rubber. Some materials like polyurethane rubber are quite smooth or slippery possessing great resistance to abrasion, but lacking holding power to support the entrained sand column. With the chok 7 at the tube throat 3, sand passage or dropout is retarded.

On the other hand, a Buna N synthetic tube is well wear resistant, while having a greater coefficient of friction useful in retarding sand escape.

The above description provides some representative examples of materials that may be used as liners. The main concept is to line the tube casing with an elastic wear resistant material constructed as an independent sleeve subjected or restricted to follow the inner contour of the casing and radially inwardly deformed by the casing taper to provide a throat constriction or choke to normally pass core sand under the blowing cycle and to retain sand upon release of operative pressure. The sleeve or liner here employed is preferably formed from extruded wear resistant resilient material. Tubular units developed by other methods than by extrusion are equally feasible as liners for tubes.

Bonding materials may be used that will firmly secure the sleeve liner to the tube casing. Some examples of such bonding materials are "Pliobond" made by the Goodyear Tire & Rubber Company, and EC-847 a composition made by Minnesota Mining & Manufacturing Company. Such bonding materials may be of the heat activated type, or other chemical types.

The modified tube 9 in FIGS. 3 and 4 is like tube 1, in general construction, but one or more longitudinal slits 10 are cut into the swaged end portion of the tube to allow easier contraction of this part of the tube in swedging the same and to provide a choked tube end having a greater flexibility radially outwardly along this restricted tube section.

The tube 11 shown in FIGS. 5 and 6 is made like tube 9, but includes a continuous longitudinal slit 12 to permit limited diametral contraction of the tube to aid insertion into openings in the core box or in the blow plate within a given latitude.

The slit 12 also functions as a venting means to expose a portion of the bonding material 8 to atmosphere to aid the drying process for uniting the liner and tube along their interfacial areas. In the tube 11, the volatile or vapor matter can escape from the tube ends and also around the tube circumference toward slit 12. Without slit 12, such free substances from the bonding material could only travel toward the tube ends which slows down the drying process, particularly if the tubes are relatively long.

As previously pointed out, it is possible to draw the liner into the tube, and with suitable tolerances the two units can be assembled into a unitary composite blow tube. The preferred method is illustrated in FIGS. 7 to 12.

FIG. 7 shows a section of sleeve liner 4 suspended in stretched condition to reduce its normal exterior diameter to readily receive one or more tube casings 13, 14 or 15 thereover. A wire 16 is tightly attached at 17 to one end of the line 4 and the end of the wire is clamped at 18. Any suitable clamp 19 is attached with the other end of the liner for endwise stretching the same and to hold the hollow sleeve in that elongated position. The liner can be of considerable length as may be the wire 16, while any number of tube casings may be slipped over wire 16 prior to the tensioning operation of the liner. Then, as shown in FIG. 8, the casings can be moved endwise over the liner with room to spare between the concentric parts as best seen in FIG. 12.

The application of a bonding material 8 is illustrated in FIGS. 9 and 10 a swab 20 being employed in FIG. 9 to coat the interior of the casing 14, while a brush or the like 21 is used in FIG. 10 to coat the exterior of the tubular sleeve liner 4. Obviously, the FIG. 9 step is preferably carried out before slipping the casing onto the the wire 16, although it is possible to perform this operation after the casings are on the wire 16.

As stated previously, the external diameter of the normally constituted liner 4 is such as to firmly engage the internal surface area of the casing when in assembled relation. Preferably the liner is somewhat oversize to grip the casing and to maintain such a grip. Thus, after tension is released on the liner, the latter conforms to the internal contour of the casing as illustrated in FIG. 11. After the assembled parts have attained their final latent positions, then suitable cutters such as revolving knives 22 and 23 can be employed to sever the excess liner sections in the planes of the tube casing ends to thereby complete the blow tube such as 24 shown in FIG. 11. If heat activated bonding material is employed, the tube 24 is then subjected to a heating cycle to complete the union of the composite blow tube members.

In the tubes described, the casings are all made of rigid materials having smooth interiors for the acceptance of the tubular liners. FIG. 6A illustrates a tube casing 25 of metal or of other rigid material, wherein the interior surface has been roughened, for example, by threading, knurling, cutting or by providing other surface deformations to produce grooves or other indentations such as 26. By expanding an oversized resilient liner 27 into the casing interior, the liner will cold flow or expand into the surface deformations of the casing 25 to cause good surface union between the assembled units at the interfacial surface areas to counteract blowout or distortion of the liner under normal operative conditions. The use of an oversized liner will increase the frictional contact pressure at the interfacial areas. Also, bonding material may be used or omitted from the interfacial surfaces depending primarily upon the intensities of the sand and/or fluid flow in the tube assemblies. Obviously projections may also be used at the interfacial surfaces.

The present inventive concept is further adapted to a composite blow tube of the character shown in FIG. 13.

Tube 28 comprises a metallic outer casing or sleeve 29 having a resilient tubular liner 30 assembled therein. The casing 29 is a tube of uniform internal and external diameters, with the interior bore being threaded at 31 up to a point 32 inwardly spaced from the discharge end of the casing to provide a smooth inner diameter tip 33 bearing the original full internal bore diameter of the casing. Liner 30 is made oversized in outer diameter in relation to the uncut internal bore diameter of the casing 29, with the internal bore of the liner being uniform throughout its length.

Upon assembly of the linear through stretching as hereinbefore described, the liner, upon release of tension will expand and cold flow into the threaded portion of the casing to establish a uniform internal diameter 34 for the assembly, while the end portion 35 of the liner will be restrained by the uncut part of casing 29 to form a choke 36 at the discharge end of the blow tube 28. The threaded portion of casing 29 will hold the liner 30 in place.

The foregoing description has been directed to certain preferred forms of blow tubes and to a method of making same. Certain further modifications in the devices of the invention or in their assembly are contemplated without departing from the fundamental concept of this invention. The extend of any such modifications shall, however, be governed by the breadth and scope of the language in the following claimed subject matter directed to the blow tube of the present invention.

What I claim is:

1. A blow tube comprising a rigid tubular casing having a substantially uniform internal diameter from one end to an intermediate portion thereof, and converging smoothly from said intermediate portion to the other end thereof to provide a reduced terminal portion, and a tubular resilient sleeve under compression having a substantially uniform wall thickness, said sleeve having an outer diameter initially greater than the internal diameter of said casing and lining said casing throughout its length to define a resilient discharge choke adjacent said terminal portion.

2. A blow tube according to claim 1 wherein said casing contains a longitudinal slit in said terminal portion.

3. A blow tube according to claim 1 wherein said casing contains a longitudinal slit throughout its length.

4. A blow tube according to claim 1 wherein said casing contains a plurality of circumferentially spaced longitudinal slits in said terminal portion.

5. A blow tube according to claim 1 wherein said casing has an indented internal wall frictionally engaging said sleeve.

6. A blow tube according to claim 1 wherein said casing and sleeve are bonded together.

7. A blow tube according to claim 1 wherein said casing and sleeve are bonded by an intermediate body of adhesive.

References Cited in the file of this patent

UNITED STATES PATENTS

| | | |
|---|---|---|
| 1,681,829 | Wesseler | Aug. 21, 1928 |
| 1,708,141 | Kepler | Apr. 9, 1929 |
| 2,238,506 | Rienacker | Apr. 15, 1941 |
| 2,637,881 | Peterson | May 12, 1953 |